United States Patent [19]

Schamberg et al.

[11] 4,247,433

[45] Jan. 27, 1981

[54] PROCESS FOR THE PREPARATION OF THERMOSETTABLE UREA-FORMALDEHYDE RESINS AND METHOD FOR USE THEREOF

[75] Inventors: Eckehard Schamberg; Ulrich Holtschmidt, both of Essen; Dieter Hellwig, Bochum, all of Fed. Rep. of Germany

[73] Assignee: Th. Goldschmidt AG, Essen, Fed. Rep. of Germany

[21] Appl. No.: 42,202

[22] Filed: May 24, 1979

[30] Foreign Application Priority Data

Jun. 10, 1978 [DE] Fed. Rep. of Germany ....... 2825590

[51] Int. Cl.³ .................... C08L 61/24; C08G 12/12
[52] U.S. Cl. ................. 260/29.4 R; 428/530; 528/259
[58] Field of Search .................. 260/29.4 R, 259, 256, 260/260

[56] References Cited

U.S. PATENT DOCUMENTS

| | | | |
|---|---|---|---|
| 2,729,611 | 1/1956 | Chesley et al. | 528/259 |
| 3,198,761 | 8/1965 | O'Donnell | 528/259 |
| 3,842,039 | 10/1974 | Vargiu et al. | 528/259 |
| 4,113,701 | 9/1978 | Laqua et al. | 260/29.4 R |

FOREIGN PATENT DOCUMENTS 1513409  6/1978  United Kingdom .

*Primary Examiner*—Theodore E. Pertilla
*Attorney, Agent, or Firm*—Toren, McGeady and Stanger

[57] ABSTRACT

A method for preparing thermosettable urea-formaldehyde resins having a urea to formaldehyde molar ratio of 1:1 to 1:1.5 wherein urea and formaldehyde are first reacted in an aqueous solution at a molar ratio of 1:1.5 to 1:4 in the pH range between 7.5 to 10, and then condensing the reactants in a pH range from 4 to 6 to a precipitation number of 1:1.5 to 1:10, thereafter adjusting the pH to 7 to 10 and adding the remaining urea to obtain a molar ratio of 1:1 to 1:1.5 and continuing the reaction until a precipitation number of 1:0.5 to 1:3 is obtained. The products obtained have a uniform molecular weight and good penetration properties when used to impregnate supporting webs for coating wood-based panels.

10 Claims, No Drawings

PROCESS FOR THE PREPARATION OF THERMOSETTABLE UREA-FORMALDEHYDE RESINS AND METHOD FOR USE THEREOF

BACKGROUND OF THE INVENTION

1. Field of the Invention

The invention relates to a process for the preparation of thermosettable urea-formaldehyde resins with a molar ratio of urea to formaldehyde of 1:1 to 1:1.5 and the use of such resins for the impregnating and/or coating of supporting webs used for the surface finishing of wood-based materials.

2. Description of the Prior Art

Thermosettable urea-formaldehyde resins are especially desirable as coating resins because of their comparatively low raw material costs. Nevertheless, melamine-formaldehyde resins are preferably used, especially for coatings of high quality. The reason for this lies mainly in the fact that the preparation of urea-formaldehyde resins of high quality presents great difficulties. Relative to melamine-formaldehyde resins, urea-formaldehyde resins have the particular disadvantage of decreased water resistance.

In recent years, however, processes for the preparation of high-grade, temperature stable, thermosettable urea-formaldehyde resins with outstanding surface-forming properties have become known. For example, German Offenlegungsschrift No. 24 48 472 describes the preparation of urea-formaldehyde resins for use in impregnating and coating of supporting webs and which, because of their special properties, make high quality surface coatings possible on wood-based panels.

However, this thermosettable urea-formaldehyde resin still possesses certain disadvantages. One of these problems is that, in addition to the resin having a molecular weight range desirable for the application, the resin solution also contains portions of resin of significantly lower and higher molecular weights than the desired range. The higher molecular portions of resin may frequently lead to precipitates in the solution and hinder the penetration of the resin into the coating web, which, as a rule, consists of paper. The lower molecular portions increase the hydrophilicity of the coating resin and, in the set state, readily lead to blocking (sticking together) of the coated supporting webs while they are being stored.

The thermosettable urea-formaldehyde resins are prepared in the usual manner in that, initially, urea and formaldehyde are reacted in the alkaline pH range. In this reaction, there is essentially only the addition of formaldehyde to the NH$_2$ group of the urea with the formation of N-methylol groups. In a subsequent acidic reaction step, these initially obtained compounds are condensed to higher molecular, settable products. The course of the reaction and the synthesis of the reaction products formed depend essentially on the molar ratio of urea to formaldehyde which has been selected. Depending on the availability of formaldehyde, the products obtained are highly compatible with water, soluble to a very limited extent, or completely insoluble in water.

The limited water solubility of urea-formaldehyde resins with a low proportion of formaldehyde is the consequence of a very broad distribution of molecular weights. In the case of a decreased formaldehyde availability, the condensation in the acidic pH range takes place much less uniformly than in the case of a greater formaldehyde availability. This decreased formaldehyde availability leads to the formation of higher molecular, partially insoluble condensation products. At the same time, as a consequence of the irregular course of the reaction, relatively low molecular condensation products are also formed. As already mentioned, the low molecular resin portions particularly increase the water sensitivity of the coating resin, while the high molecular condensation products are not as soluble and prevent the penetration of the resin solutions into the supporting webs.

If the molar ratio of urea to formaldehyde is changed by using higher formaldehyde contents, the formation of higher molecular condensation product is suppressed or, under certain circumstances, is avoided completely. However, in the set state, the resins become increasingly more water sensitive. This impairs the end-use properties of the hardened resins.

U.S. Pat. No. 3,198,761 describes a process according to which urea-formaldehyde resins, with a molar ratio of urea to formaldehyde of 1:1 to 1:0.5, may be prepared.

SU Pat. No. 496,291 describes a process wherein an aminoplast adhesive resin is produced in a vacuum by successive condensations of urea and formaldehyde. The first is at a pH value of 7 to 8 and a temperature of 80° to 95° C., and then is at a pH value of 4 to 5 and a temperature of 80° to 95° C. The next condensation is with an additional amount of a nitrogenous compound, particularly urea, thiourea, melamine and cyanuric acid. This process is intended to ensure a low content of free formaldehyde in the finished resin and the waste waters and to reduce the amount of free formaldehyde which is separated during the hot bonding of materials. For this purpose, the precondensation is carried out at a pH value of 9 to 11 and a temperature of 65° to 95° C., wherein the ratio of the total amount of nitrogenous compound and formaldehyde is in the molar range of 1:0.9 to 1.35.

In the production of this resin, widely varying molecular weights are obtained. Particularly, higher molecular condensation products are formed which are, in part, insoluble. This can be recognized by the milky turbidity of the adhesive resin solution. Therefore, these resins are also unsuitable for impregnating and coating paper webs which are intended for the surface finishing of wood-based panels.

According to this process, urea and formaldehyde are initially reacted in the alkaline range, using a molar ratio of 1:1.3 to 1:1.66 and are subsequently condensed at a pH from 2.5 to 5.0. To the reaction product thus obtained, urea is added in an amount such that a molar ratio of urea to formaldehyde of 1:1 to 1:0.5 results, and the mixture is condensed once again in the pH range of 3.0 to 5.5.

By this procedure, resins of varying molecular weights are formed which contain, in addition to higher molecular condensation products, a large portion of very low molecular products as well as free urea. These resins are not suitable for impregnating and coating paper webs, which are intended for the surface finishing of wood-based panels.

SUMMARY OF THE INVENTION

We have discovered a process for the preparation of thermosettable urea-formaldehyde resins, which contain neither higher molecular portions which interfere with penetration, nor relatively lower molecular resin portions which increase the hydrophilicity of the coating resin.

This is accomplished by preparing urea-formaldehyde resins in which the molar ratio of urea to formaldehyde is 1:1 to 1:1.5, and preferably is 1:1 to 1:1.2 and which are essentially of uniform molecular weight and do not interfere with penetration during the impregnation of supporting webs and which can be used for coating wood-based panels. Further, these resins do not lead to an interfering hydrophilicity of the coating resin in the supporting web before and after setting.

More specifically, in the present process:
(a) urea and formaldehyde are reacted in an aqueous solution at a molar ratio of 1:1.5 to 1:4 in the pH range of $\geq 7.5$ to 10 at 40° to 95° C. for 5 to 120 minutes, and then
(b) while maintaining a pH in the range of $\geq 4$ to 6 at 40° to 95° C., the reactants are condensed for 1 to 60 minutes to a precipitation number of 1:1.5 to 1:10 and
(c) after the pH is adjusted to a value between $\geq 7.0$ and 10, the remaining amount of urea required for achieving a urea to formaldehyde molar ratio of 1:1 to 1:1.5, is added, the reaction being continued at 70° to 95° C. for a further 1 to 45 minutes to a precipitation number of 1:0.5 to 1:3, and then the solution obtained is cooled to room temperature.

DESCRIPTION OF THE PREFERRED EMBODIMENT

The aspects of the invention, essential for obtaining resins of a urea to formaldehyde ratio of 1:1 to 1:1.5 with the required properties, are the combination of the above three process steps (a), (b), and (c), and the adherence to the degree of condensation, determined by the precipitation number.

The term precipitation number is understood to mean the ratio of resin solution to that volume of water, which must be added to one part by volume of resin solution so that a persistent cloudiness at room temperature in the resultant mixture is barely present. Prior art urea-formaldehyde resins contain relatively large portions of high molecular weight condensation products with a low molar proportion of formaldehyde. In such resins, it is not possible to control the degree of condensation within the desired range by the precipitation number because the solution becomes cloudy at a relatively early time in the condensation reaction. However, in the present process, it is possible to monitor the degree of condensation of the resin during process steps (b), (c) and optionally (d). As a result, the preparation of urea-formaldehyde resins, even with relatively low molar portions of formaldehyde, on a production scale is made possible.

In the present process, the reaction of urea with formaldehyde, in a molar ratio of 1:1.5 to 1:1.4, is initially carried out in the alkaline region. In so doing, the adherence to this molar ratio range is of particular importance. Thus, only addition reactions occur in the given pH range of 7.5 to 10. A pH range of 8 to 9 is particularly preferred. The reaction should therefore be carried out in a clearly alkaline range.

The methylol urea compounds formed in process step (a) are condensed in step (b) in a pH range of $\geq 4$ to 6, while the condensation reaction should take place in a temperature range of 40° to 95° C. for a period of 1 to 60 minutes. It is important to adhere to the degree of condensation, determined by the precipitation number of 1:1.5 to 1:10.

The pH of the solution of the precondensate thus obtained is then adjusted to a range from $\geq 7$ to 10, preferably from 7 to 8.

The remaining amount of urea, which is required in order to adjust the molar ratio of urea to formaldehyde to the desired value of 1:1 to 1:1.5 is then added. The reaction is now carried out in this alkaline range at 70° to 95° C. during a period of 1 to 45 minutes, until a precipitation number of 1:0.5 to 1:3 is reached. Subsequently, the solution is cooled to room temperature.

It is emphasized that the amount of urea added is considerably above the amount required to bind the free formaldehyde still present in the solution. It would not have been expected by those skilled in the art that the urea is reacted almost completely, when the reaction is carried out in the alkaline pH range. The outstanding properties of the surface finishing layers prepared with this resin reflect this surprising course of the reaction. Thus, these layers exhibit no interfering hydrophilicity from which it may be concluded that significant amounts of low molecular condensation products or free urea are not present in the resin. The fact that the water dilutability of the resin decreases in reaction step (c) is also a clear sign of the fact that while higher molecular products are formed, the molecular weight of these products is not high enough to render these products insoluble.

Accordingly, the process of the present process is suitable for preparing urea-formaldehyde resins having a uniform molecular weight distribution and the desired low molar portion of formaldehyde. The present process makes it possible to adhere to extremely low molar ratios of urea to formaldehyde, even down to 1:1. According to the state of the art, this limit for impregnating and coating resins previously was 1:1.5. After impregnating and drying, the resins of the present invention after pressing, exhibit an extremely low water sensitivity in the unhardened state as well as in the hardened state. At the same time, solutions of these resins exhibit outstanding penetration of the supporting web.

In another embodiment of the present process, the reaction in process step (c) is carried out to a precipitation number of 1:$\geq$1.5 and in a further processing step,
(d) a post-condensation is carried out once again in the pH range of $\geq 4$ to 6 at 70° to 95° C. for up to 15 minutes to a precipitation number of 1:$\geq$0.5, after which the reaction mixture is cooled and adjusted to a pH in the range of $\geq 7$ to 10.

The pH is adjusted to a value within the range of $\geq 7$ to 10 for the purpose of stabilizing the resin solution and the adjustment is intended to exclude any uncontrolled postcondensation on storage.

A further decrease in the molecular weight extremes at the top and at the bottom can be achieved if the reaction temperatures in process steps (a) and (b) are clearly lowered relative to the state of the art ($\geq$70° C.) to between 40° and 70° C. This additional effect can be recognized by the fact that the opalescence of the resin solutions which generally sets in after some hours, is clearly reduced. Hand in hand with this effect is a better ability of the resin solution to penetrate during the impregnation of supporting webs. Finally, the hygroscopic behavior of the impregnated and dried supporting webs is also reduced, indicating a decrease in the portion of the components of lowest molecular weights.

The inventively prepared resins are storage stable in aqueous solution for several weeks.

A particularly preferred embodiment of the inventive process resides in maintaining the molar ratio of urea to formaldehyde in process step (a) at 1:2 to 1:2.5.

Resins, with particularly good properties from an application point of view, are obtained when the pH range in steps (a) and (c) is adjusted with ammonia and/or urotropine and if the pH range of $\geq 4$ to 6 in step (b) is maintained by the addition of ammonia and/or urotropine.

Modifiers and hardeners, which are well known in the art, may be added during or after the preparation of the inventive urea-formaldehyde resin. Such hardeners are, for example, latent hardeners as well as hardeners and are chemically incorporated into the resin molecule. Modifiers for increasing the crack stability and for improving the elasticity of the coating are, for example, amides of toluene-sulfonic acid.

Within the scope of the present process, the addition of an aminosulfonic acid having the formula $NH_2(CH_2)_xSO_3H$, in which x is a whole number from 0 to 4, is preferred. The aminosulfonic acid is added especially before or during process step (a) in amount of 0.2 to 1.0 mmoles. A further addition of 0.8 to 10 mmoles of aminosulfonic acid to the solution, obtained at the conclusion of process step (a) and before process step (b) lead to products with particularly good use properties.

Polyhydroxy compounds, e.g., sugar, are known as means for improving the resin flow under the conditions existing in the press and/or for increasing the crack stability. The use properties of the resins may furthermore be influenced by the addition of acrylate dispersions. A summary of the state of the art of known modifiers may be found in the journal "Kunststoff-Rundschau" 13 (1966), pages 349 ff.

In the following examples, the preparation of urea-formaldehyde resins according to the present invention is described and their use for impregnating and coating supporting webs for the surface finishing of wood-based panels is explained.

EXAMPLE 1

Step (a)

To a 2 liter four-neck flask, equipped with thermometer, reflux condenser and pH measuring facility, there are added 487 g (6 moles) of a 37% formalin solution and 1.6 g (0.8 mmoles) of a 5% aqueous solution of amidosulfonic acid. After the addition of 6.4 g (15 mmoles) of a 33% aqueous solution of urotropine, 180 g (3 moles) of urea are added, followed by 34.2 g (0.2 moles) of p-toluenesulfonamide. A pH value of 8.4 is now measured at room temperature in the reaction solution. The reaction solution is heated to 90° C. and, after 10 minutes, 4.2 g (10 mmoles) of a 33% aqueous urotropine solution are added in order to shift the pH of the reaction mixture, which in the meantime has fallen to values $\geq 6$, back into the alkaline range. After a further 10 minutes, the reaction mixture has a viscosity of 60 cP at 20° C. The reaction mixture is cooled to 80° C.

Step (b)

After the addition of 5.9 g (3 mmoles) of a 5% aqueous amidosulfonic acid solution, the pH of the reaction mixture adjusts to a value of 4.5 at 80° C. This pH is maintained during the subsequent acidic condensation step by adding a few drops of urotropine solution whenever the pH value falls. After a reaction time of 30 minutes, a precipitation number of 1:5 is reached. The reaction is continued until a precipitation number of 1:1.8 is reached.

Step (c)

Now 21.2 g (50 mmoles) of a 33% aqueous urotropine solution and 180 g (3 moles) of urea are added. The reaction mixture is heated to 85° C. and kept for 35 minutes at this temperature. The precipitation number now is 1:0.7. During the cooling period of the reaction mixture, 22.6 g (0.2 moles) of an $\epsilon$-caprolactam are added.

The urea-formaldehyde resin solution obtained is stable for several weeks. The solution is water clear and can be diluted with water to a limited extent. The viscosity is 14 DIN second (4 mm viscosity cup, 20° C.). After 16 hours, a slight cloudiness develops in the resin solution.

EXAMPLE 2

Step (a)

Into a 2 liter four-neck flask, equipped as described in Example 1, 487 g (6 moles) of a 37% aqueous formaldehyde solution, 1.6 g (0.8 mmoles) of a 5% aqueous amidosulfonic acid solution and 6.4 ml (15 mmoles) of a 33% aqueous urotropine solution are added. Urea (150 g) and 34.2 g (0.2 moles) of a mixture of 60 parts by weight of p- and 40 parts by weight of o-toluenesulfonamide are now added. The pH in the reaction solution has adjusted to a value of 8.4 at room temperature. The reaction mixture is brought to a temperature of 50° C. and kept at this temperature for 1 hour.

Step (b)

A 5% aqueous amidosulfonic acid solution (9.6 ml, 4.8 mmoles) is added to the reaction mixture. A pH of 6.6 is now measured at 50° C. in the reaction mixture, which is then heated to a temperature of 60° C. At equal intervals of of 30 minutes in a period of 90 minutes, 3.2 g quantities (1.6 mmoles) of the 5% aqueous amidosulfonic acid solution are added. After 100 minutes, a pH of 3.2 is measured in the reaction mixture. The precipitation number is 1:3.

Step (c)

A 33% aqueous urotropine solution (25.6 ml, 60 mmoles) is now added, as a result of which the pH increases to 6.4. Urea (210 g, 3.5 moles) is then added and the reaction temperature is increased to 90°–95° C. The reaction mixture is kept at this temperature for 35 minutes, until a precipitation number of 1:2 is reached.

While the reaction mixture is being cooled, 14.6 g (0.2 moles) of N-methylacetamide are added.

The resin solution has a pH of 7.8 at 20° C. The solution is water-clear and storage-stable for several weeks. After 10 days, a slight cloudiness develops in the resin solution. The free urea content is 1.6%, based on the total solids.

EXAMPLE 3

Step (a)

A flask, equipped as described in Example 1, is charged with 487 g (6 moles) of a 37% formalin solution and 1.6 g (0.8 mmoles) of a 5% aqueous amidosulfonic acid solution are added. After the addition of 6.4 g (15 mmoles) of a 33% aqueous urotropine solution, 120 g (2 moles) of urea and 34.2 g (0.2 moles) of p-toluenesulfonamide are added. The pH of the reaction solution is now measured to be 8.2 at room temperature. The reaction solution is heated to 90° C. and, after 10 minutes, mixed with 4.2 g (10 mmoles) of a 33% aqueous urotropine solution.

Step (b)

After a further 10 minutes, the solution is cooled to 80° C. and its pH is adjusted to 4.5 with a 5% aqueous solution of amidosulfonic acid, for which purpose 5.3 g (ca. 2.5 mmoles) are required. Any further lowering of the pH in the reaction solution is prevented by the addition of a few drops of urotropine solution. After 30 minutes, a precipitation number of 1:10 is attained.

Step (c)

The reaction solution is mixed with 21.2 g (50 mmoles) of a 33% aqueous urotropine solution and 120 g of urea. A pH value of 7.2 is reached. The reaction mixture is kept for 40 minutes at 85° C. After this time, a precipitation number of 1:2.0 is measured. The reaction mixture is cooled and mixed with 60.9 g (0.15 moles) of $\epsilon$-caprolactam.

The urea-formaldehyde resin solution obtained is water-clear. After about 5 days, a slight cloudiness is noted. The viscosity of the undiluted resin is 13.5 seconds (4 mm DIN cup, 20° C.).

EXAMPLE 4

Step (a)

A flask, equipped as described in Example 1, is charged with 487 g (6 moles) of a 37% aqueous formaldehyde solution, which is then mixed with 1.0 g (0.5 mmoles) of a 5% aqueous solution of amidosulfonic acid. After the addition of 5.3 ml (12.5 mmoles) of a 33% aqueous solution of urotropine, 120 g (2 moles) are added, as a result of which the pH in the reaction mixture adjusts to a value of 8.3. The reaction mixture is heated to 90° C. and kept for 20 minutes at this temperature.

Step (b)

After cooling the reaction mixture to 60°-70° C., its pH is adjusted to 6.0 with 1.5 N sulfuric acid. A further 120 g (2 moles) of urea are then added. The reaction mixture is heated to 85° C. and kept for about 15 minutes at this temperature, until a precipitation number of 1:5 is attained. The pH of the reaction mixture is checked continually and prevented from falling below 4.0 by additions of a few drops of urotropine solution.

Step (c)

A 33% aqueous solution of urotropine (14.9 g, 35 mmoles) is now added and the reaction mixture is kept at a pH of 7.1 and a temperature of 85° C. for about 10 minutes, until the precipitation number is 1:2.

Step (d)

The pH value of the reaction solution is adjusted with 1.5 N sulfuric acid to a value of 4.5. The reaction solution is kept for 10 minutes at a temperature not greater than 85° C., occasional cooling being required, until a precipitation number of 1:0.5 is attained. Subsequently, the solution is cooled and mixed with 22.6 g (0.2 moles) of $\epsilon$-caprolactam. The pH of the cooled resin solution is adjusted with a 30% sodium hydroxide solution to a value of 9.0.

The urea-formaldehyde solution is water-clear, has a DIN viscosity of 13.5 seconds (4 mm viscosity cup, 20° C.) and, only after some hours, develops an incipient cloudiness, which does, however, not interfere with the paper supporting web.

EXAMPLE 5

(Comparison examples in accordance with German Offenlegungsschrift No. 24 48 472, but not in accordance with the present invention)

A 2 liter four-neck flask, equipped with thermometer, reflux condenser, stirrer and facilities for continuously measuring the pH, is charged with 584 g (7.2 moles) of a 37% formalin solution, as well as with 1 g (2 mmoles) of a 20% aqueous solution of amidosulfonic acid. After the further addition of 8 g (120 mmoles) of a 25% aqueous solution of ammonia and 210 g (3.5 moles) of urea, the pH of the reaction mixture changes to a value of 8 at 20°C.

While being stirred well, the preparation is heated to 90° C. and left at this temperature. Within 10 minutes of reaction time, the pH value of the reaction medium, measured at 90° C., has fallen to 5.8. By the further addition of 8 g (120 mmoles) of a 25% aqueous solution of ammonia, the pH is once again into the alkaline range.

After a further 10 minutes of reaction time, the reaction mixture has a viscosity of 60 cP at 20° C. and is mixed with 3 g (6 mmoles) of a 20% aqueous solution of amidosulfonic acid. The pH of the reaction mixture at 90° C. changes to 3.8, and is increased by the addition of 3 g (45 mmoles) of a 25% aqueous solution of ammonia to a value of 4.4 at 90° C.

The well stirred reaction mixture is left at this pH and at a reaction temperature of 90° C. for 20 minutes. The reaction preparation now has a viscosity of 90 cP and a pH of 5.2 at 20° C.

The reaction mixture is briefly cooled, mixed with 30 g (0.5 moles) of urea and 25 g (370 mmoles) of a 25% aqueous solution of ammonia. In so doing, the pH of the reaction mixture changes to a value of 6.5° at 85° C. The temperature is once again increased to 90° C. and the preparation is reacted for a further 20 minutes at this temperature.

The clear, colorless urea-formaldehyde resin, cooled to 20° C., has a pH of 7.2 and a viscosity of 95 cP.

EXAMPLE 6

(Comparison example, in accordance with Example IV of U.S. Pat. No. 3,198,761; not in accordance with the present invention)

The pH of 200 g of a 37% formalin solution is adjusted to 7.5 with 1 N sodium hydroxide. Urea (65 g) is now added, the pH changing to 9.1. The reaction mixture is brought to a temperature of 45° C. After 5 minutes, the pH has fallen to a value of 7.2 and is then adjusted with 30% sodium hydroxide to a value of 8.2. The reaction mixture is now kept for 25 minutes at a temperature of 90° C.

Subsequently, it is cooled to 80° C. and its pH is adjusted to a value of 3.5 with 30% phosphoric acid. After about 3 minutes, a distinctly exothermic reaction sets in. By cooling intensively, the reaction mixture is held at a temperature of 75° to 80° C. After 20 minutes, it is cooled to 45° C. Now 126 g of urea are added and the preparation is kept at 45° C. for a further 3 minutes. The reaction mixture, when cooled, has a pH of 8.9. The resin is clear and miscible with water.

Testing the Technical Application of the Resin Solutions Obtained in Examples 1 to 6

From each of the urea resin solutions obtained in Examples 1 to 2, a 200 parts by weight portion is taken and intensively mixed with 2 parts by weight of a 50% hardener solution, consisting of the triethanolamine salt of p-toluene-sulfonic acid, and 2 parts by weight of a conventional, commercial, mineral-oil based released agent. A white, pigmented, absorptive, refined pulp paper, with an area weight of 80 g/m² is so treated that an impregnated and coated paper supporting web is obtained, which has a final weight of 200 g/m² and a volatiles content of 6.5%. The volatiles content is the loss in weight which the resin-impregnated and coated paper supporting web suffers during a 10-minute temperature treatment at 160° C.

The resin-impregnated and coated paper supporting webs are stacked and stored in a conditioning chamber for 24 hours at a relative humidity of 95%. At the same time, the the particular temperature is determined at which the sheets of the stack commence to stick to one another while the stack is under a pressure of 2 kg. The results of this test are given in Table 1. The resin-impregnated and coated supporting webs are used for finishing the surface of 16 mm thick chipboard. The pressing conditions are 3 minutes, 160° C. at the platten of the press, 2,000 kg pressure, asbestos pressure pads, without closed-cycle cooling. The panels are pressed against chrome-plated brass metal sheets with a decreased degree of gloss.

The chipboards so finished are subjected to the following tests:

(a) acid test; the attack on the surface by 0.2 N hydrochloric acid over a period of 24 hours is evaluated;
(b) uniformity, gloss and compactness of the surface are evaluated;
(c) water-vapor test according to DIN No. 53 799.

Tests (a), (b) and (c) are evaluated according to a scale of 1 to 6, 1 being "very good", and 6 being "completely unadequate".

(d) crack test; the behavior of the finished surfaces under a 20-hour continuous thermal stress at 70° C. is tested. The surfaces are examined for crack formation and evaluated by a method based on DIN No. 53 799.

The test results are summarized in Table 1.

Table I

| Resin Solution from Example | Optical Appearance | Cloudiness After | Precipitation Number | Viscosity according to DIN, 4 mm Orifice | Penetration Time* |
|---|---|---|---|---|---|
| 1 | clear | 16 hours | 1:0.7 | 14.0" | 3.5" |
| 2 | clear | 10 days | 1:2 | 14.0" | 1.5" |
| 3 | clear | 5 days | 1:1 | 13.5" | 2.0" |
| 4 | clear | 10 hours | 1:0.5 | 13.5" | 1.9" |
| 5 | cloudy | — | — | 15.0" | 2.0" |
| 6 | clear | >10 days | >1:10 | 13.8" | 1.5" |

*The penetration time is that time, which a resin solution requires in order to impregnate a 80 g/m² standard, refined pulp paper from bottom to top. The resin solution, which is to be tested, is colored in order to improve the end-point determination.

Table II

| Resin Solution from Example | Properties of the Impregnated and Coated Paper Supporting Web in the Conditioning Chamber at a Relative Humidity of 95% The sheets of the stack stick together at: | Properties of the Finished Wood Based Surface | | | |
|---|---|---|---|---|---|
| | | Surface Degree of Gloss 40 | Acid Test 0.1N HCl | Water Vapor Test | Crack Test According to DIN 53 799 |
| 1 | 30–35° C. | 2 | 2–3 | 2 | 0 |
| 2 | 35° C. | 1–2 | 2 | 2 | 1 |
| 3 | 30° C. | 2–3 | 2–3 | 2–3 | 0 |
| 4 | 40° C. | 4 | 3–4 | 3–4 | 2 |
| 5 | 20–25° C. | 4 | 3–4 | 3 | 2 |
| 6 | 15–20° C. | 6* | 6** | 6 | 2 |

*Surface is spotted and open
**Resin can already be removed with water
It therefore follows that only the urea-formaldehyde resins prepared according to the present invention exhibit the combination of desired properties.

What is claimed is:

1. A process for the preparation of thermosettable urea-formaldehyde resins with a molar ratio of urea to formaldhyde of 1:1 to 1:1.5, comprising the steps of:
   (a) reacting urea and formaldehyde for 5 to 120 minutes at 40° to 95° C. in an aqueous solution at a molar ratio of 1:1.5 to 1:4 and in the pH range of ≧7.5 to 10; and then
   (b) further reacting the mixture to effect condensation while maintaining the pH in the range of ≧4 to 6 at 40° C. to 95° C. for 1 to 60 minutes until a precipitation number of 1:1.5 to 1:10 is achieved; and then
   (c) adjusting the pH to a value from ≧7.0 to 10, and adding the remaining amount of urea required for achieving a molar ratio of 1:1 to 1:1.5 and then continuing the reaction at 70° to 95° C. for 1 to 45 minutes, until a precipitation number of 1:0.5 to 1:3 is reached; and then cooling the solution obtained at room temperature.

2. The process of claim 1 wherein in step (c), the reaction is continued to a precipitation number of 1:≧1.5 and wherein the solution from step (c) is subjected to further condensation in the pH range of ≧4 to 6 for up to 15 minutes at 70° to 95° C. to produce a precipitation number of 1:≧0.5.

3. The process of claims 1 or 2 wherein the molar ratio of urea to formaldehyde in step (a) is 1:2 to 1:2.5.

4. The process of claims 1 or 2 wherein urea is added in such an amount in step (c) that a molar ratio of urea to formaldehyde of 1:1 to 1:1.2 is obtained.

5. The process of claims 1 or 2 wherein the reactions in steps (a) and (b) are carried out in the temperature range of 40° to 70° C.

6. The process of claims 1 or 2 wherein the pH in steps (a) and (c) is adjusted with ammonia or urotropine and is maintained within the range of ≧4 to 6 in step (b).

7. The process of claims 1 or 2 wherein a modifier is added to the urea-formaldehyde resin before, during, or after its preparation.

8. The process of claims 1 or 2 wherein 0.2 to 1.0 mmoles of an aminosulfonic acid having the formula $NH_2(CH_2)_xSO_3H$, in which x is a whole number from 0 to 4, is added to the reaction mixture before or during process step (a).

9. The process of claims 1 or 2 wherein 0.2 to 1.0 mmoles of an aminosulfonic acid having the formula $NH_2(CH_2)_xSO_3H$, in which x is a whole number from 0 to 4, are added to the reaction mixture before or during process step (a) and 0.8 to 10 mmoles of said aminosulfonic acid are added to the reaction mixture after process step (a) and before process step (b).

10. In a method of surface finishing of wood-based panels wherein a supporting web is impregnated with a urea-formaldehyde resin, the improvement which comprises said resin being the resin of claim 1.

* * * * *